US010611212B2

United States Patent
Kuroda et al.

(10) Patent No.: US 10,611,212 B2
(45) Date of Patent: Apr. 7, 2020

(54) AIR CONDITIONER FOR VEHICLE

(71) Applicant: Panasonic Intellectual Property Management Co., Ltd., Osaka (JP)

(72) Inventors: Kentaro Kuroda, Kanagawa (JP); Yoshitoshi Noda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 16/084,006

(22) PCT Filed: Jan. 26, 2017

(86) PCT No.: PCT/JP2017/002647
§ 371 (c)(1),
(2) Date: Sep. 11, 2018

(87) PCT Pub. No.: WO2017/163594
PCT Pub. Date: Sep. 28, 2017

(65) Prior Publication Data
US 2019/0255910 A1 Aug. 22, 2019

(30) Foreign Application Priority Data

Mar. 25, 2016 (JP) ................................. 2016-062526

(51) Int. Cl.
*B60H 1/00* (2006.01)
*B60H 1/10* (2006.01)
*B60H 1/03* (2006.01)

(52) U.S. Cl.
CPC ..... *B60H 1/00914* (2013.01); *B60H 1/00271* (2013.01); *B60H 1/034* (2013.01);
(Continued)

(58) Field of Classification Search
CPC ...... B60H 1/00914; B60H 1/034; B60H 1/10; B60H 1/00271; B60H 2001/00928; B60H 2001/00307
See application file for complete search history.

(56) References Cited

U.S. PATENT DOCUMENTS 5,299,431 A * 4/1994 Iritani ................ B60H 1/00021
62/243
5,531,264 A * 7/1996 Eike ................... B60H 1/00014
165/42

(Continued)

FOREIGN PATENT DOCUMENTS

JP 2005-002983 1/2005
WO 2015/011887 1/2015

OTHER PUBLICATIONS

International Search Report of PCT application No. PCT/JP2017/002647 dated Mar. 21, 2017.

*Primary Examiner* — Ljiljana V. Ciric
(74) *Attorney, Agent, or Firm* — Greenblum & Bernstein, P.L.C.

(57) ABSTRACT

A vehicle air conditioner includes: a compressor that compresses a refrigerant; a heat exchanger that performs heat exchange between the refrigerant and a heat transporting coolant; a condenser that condenses the refrigerant having a high-temperature and a high-pressure by dissipating heat thereof; an evaporator that performs heat exchange between air sent to a vehicle interior and the refrigerant having a low-temperature and a low-pressure; a refrigerant passage that flows the refrigerant therein; and an on-off valve capable of shutting off the refrigerant passage. A part of the refrigerant passage from the condenser to the compressor in the air-cooling refrigerant circuit is branched into a first passage passing through the evaporator and a second passage passing through the heat exchanger being in parallel to the evapo- (Continued)

rator. The on-off valve is disposed upstream of the heat exchanger in the second passage.

5 Claims, 8 Drawing Sheets

(52) U.S. Cl.
CPC ..... *B60H 1/10* (2013.01); *B60H 2001/00307* (2013.01); *B60H 2001/00928* (2013.01)

(56) References Cited

U.S. PATENT DOCUMENTS

| | | | | |
|---|---|---|---|---|
| 5,641,016 A * | 6/1997 | Isaji | ............... | B60H 1/00007 |
| | | | | 165/43 |
| 5,899,086 A * | 5/1999 | Noda | ............... | B60H 1/00914 |
| | | | | 62/244 |
| 6,047,770 A * | 4/2000 | Suzuki | ............... | B60H 1/00007 |
| | | | | 165/202 |
| 6,125,643 A * | 10/2000 | Noda | ............... | B60H 1/00914 |
| | | | | 165/202 |
| 6,237,357 B1 * | 5/2001 | Hirao | ............... | B60H 1/004 |
| | | | | 62/325 |
| 6,347,528 B1 * | 2/2002 | Iritani | ............... | B60H 1/00357 |
| | | | | 62/324.6 |
| 7,055,590 B2 * | 6/2006 | Hara | ............... | B60H 1/00314 |
| | | | | 165/202 |
| 8,517,087 B2 * | 8/2013 | Zeigler | ............... | B60H 1/00907 |
| | | | | 165/202 |
| 9,476,618 B2 * | 10/2016 | Takenaka | ............... | F25B 13/00 |
| 10,189,332 B2 * | 1/2019 | Miyakoshi | ............... | B60H 1/00392 |
| 10,220,678 B2 * | 3/2019 | Miyakoshi | ............... | B60H 1/00921 |
| 10,427,495 B2 * | 10/2019 | Suzuki | ............... | B60H 1/00864 |
| 2005/0178523 A1 * | 8/2005 | Itoh | ............... | B60H 1/00385 |
| | | | | 165/42 |
| 2006/0032623 A1 * | 2/2006 | Tsubone | ............... | B60H 1/00492 |
| | | | | 165/202 |
| 2013/0319029 A1 * | 12/2013 | Sekiya | ............... | B60H 1/00899 |
| | | | | 62/238.7 |
| 2014/0069123 A1 * | 3/2014 | Kim | ............... | F25B 5/04 |
| | | | | 62/61 |
| 2014/0345312 A1 * | 11/2014 | Katoh | ............... | B60H 1/00342 |
| | | | | 62/277 |
| 2015/0027162 A1 * | 1/2015 | Ohno | ............... | B60H 1/00278 |
| | | | | 62/525 |
| 2015/0075204 A1 * | 3/2015 | Brodie | ............... | B60H 1/00907 |
| | | | | 62/324.6 |
| 2015/0224849 A1 * | 8/2015 | Takeuchi | ............... | F25B 5/00 |
| | | | | 62/243 |
| 2015/0260439 A1 * | 9/2015 | Ohta | ............... | F25B 5/00 |
| | | | | 62/196.1 |
| 2015/0273976 A1 * | 10/2015 | Enomoto | ............... | B60K 6/22 |
| | | | | 165/202 |
| 2015/0295285 A1 * | 10/2015 | Takeuchi | ............... | B60L 3/0023 |
| | | | | 62/498 |
| 2015/0330351 A1 * | 11/2015 | Ragazzi | ............... | F02N 19/04 |
| | | | | 123/552 |
| 2016/0059666 A1 * | 3/2016 | Chen | ............... | F28F 9/00 |
| | | | | 62/238.7 |
| 2016/0137032 A1 * | 5/2016 | Kuroda | ............... | B60H 1/08 |
| | | | | 165/104.32 |
| 2016/0153343 A1 * | 6/2016 | Kakehashi | ............... | B60H 1/00278 |
| | | | | 123/41.31 |
| 2016/0159199 A1 | 6/2016 | Kuroda et al. | | |
| 2016/0318499 A1 * | 11/2016 | Yamanaka | ............... | B60L 58/27 |
| 2016/0332504 A1 * | 11/2016 | Blatchley | ............... | F25B 47/022 |
| 2016/0332505 A1 * | 11/2016 | Yamanaka | ............... | B60L 1/003 |
| 2016/0339761 A1 * | 11/2016 | Enomoto | ............... | B60H 1/00278 |
| 2016/0339767 A1 * | 11/2016 | Enomoto | ............... | B60H 1/00785 |
| 2017/0021695 A1 * | 1/2017 | Durrani | ............... | B60H 1/00921 |
| 2017/0021698 A1 * | 1/2017 | Hatakeyama | ............... | F25B 7/00 |
| 2017/0028813 A1 * | 2/2017 | Enomoto | ............... | B60H 1/24 |
| 2017/0050493 A1 * | 2/2017 | Nishikawa | ............... | B60H 1/03 |
| 2017/0198946 A1 * | 7/2017 | Takenaka | ............... | F25B 41/04 |
| 2017/0203635 A1 * | 7/2017 | Kuroda | ............... | B60H 1/32284 |
| 2017/0217286 A1 * | 8/2017 | Tsukamoto | ............... | B60H 1/22 |
| 2017/0217287 A1 * | 8/2017 | Kuroda | ............... | B60H 1/3227 |
| 2018/0354344 A1 * | 12/2018 | Miura | ............... | F25B 49/02 |
| 2019/0184790 A1 * | 6/2019 | Miura | ............... | B60H 1/00899 |
| 2019/0219315 A1 * | 7/2019 | Michael | ............... | B60H 1/00914 |

* cited by examiner

AIR CONDITIONER FOR VEHICLE

This application is a U.S. national stage application of the PCT International Application No. PCT/JP2017/002647 filed on Jan. 26, 2017, which claims the benefit of foreign priority of Japanese patent application No. 2016-062526 filed on Mar. 25, 2016, the contents all of which are incorporated herein by reference

TECHNICAL FIELD

The present disclosure relates to a vehicle air conditioner.

BACKGROUND ART

A hot water heater that heats a vehicle interior using heat of engine coolant is frequently used as a conventional vehicle heating device. A heat pump air-cooling device that cools air sent to the vehicle interior using a low-temperature refrigerant of a heat pump is typically used as a conventional vehicle air-cooling device.

PTL 1 discloses a vehicle air conditioner that is based on the hot water heater and the heat pump air-cooling device, which are used in the conventional vehicle, and has improved heating performance by adding an auxiliary heating function of further heating the engine coolant by the heat pump using a compressor and a refrigerant. They are common to an air-cooling period and a heating period.

In addition to a heat generating component, such as an engine, which usually needs cooling using coolant, a component of which temperature is to be controlled, which is, for example, an onboard device such as an oil cooler and an inverter, which needs cooling and warming, is known in various component mounted on the vehicle.

CITATION LIST

Patent Literature

PTL 1: International Publication No. 2015/011887

SUMMARY OF THE INVENTION

A vehicle air conditioner according to one aspect of the present disclosure includes a compressor, a heat exchanger, a condenser, an evaporator, a refrigerant passage, and an on-off valve. The compressor compresses a refrigerant. The heat exchanger performs heat exchange between the refrigerant and a heat transporting coolant. The condenser condenses the refrigerant by dissipating heat of the refrigerant having a higher temperature and a higher pressure. The evaporator performs heat exchange between the refrigerant having a lower temperature and a lower pressure and air sent to a vehicle interior. The refrigerant passes through the refrigerant passage. The on-off valve can shut off the refrigerant passage. A heating refrigerant circuit is configured such that the refrigerant flows from the compressor, passes through the heat exchanger and returns to the compressor. An air-cooling refrigerant circuit is configured such that the refrigerant flows from the compressor, passes through the condenser and the evaporator and returns to the compressor. A part of the refrigerant passage from the condenser to the compressor in the air-cooling refrigerant circuit is branched into a first passage passing through the evaporator and a second passage passing through the heat exchanger provided in parallel to the evaporator. The on-off valve is disposed upstream of the heat exchanger in the second passage.

According to the present disclosure, the component of which temperature is to be controlled (hereinafter referred as temperature-controlled component) can easily be heated and cooled with a simple configuration at low cost based on the configuration of the conventional vehicle air conditioner including the auxiliary heating function.

DESCRIPTION OF EMBODIMENTS

Prior to describing exemplary embodiments of the present disclosure, a problem of the conventional vehicle air conditioner is briefly described. In the vehicle air conditioner disclosed in PTL 1, although engine cooling is performed, there is no description about the cooling and the warming of the temperature-controlled component. Recently, there is a strong demand for development of a vehicle air conditioner in which a temperature control function of cooling and warming the temperature-controlled component can be implemented with a simple configuration at low cost based on the configuration of the vehicle air conditioner disclosed in PTL 1.

The present disclosure provides a vehicle air conditioner that can easily heat and cool the temperature-controlled component with a simple configuration at low cost based on the configuration of the conventional vehicle air conditioner including the auxiliary heating function.

Hereinafter, each exemplary embodiment of the present disclosure will be described in detail with reference to the drawings.

First Exemplary Embodiment

Figure 1:
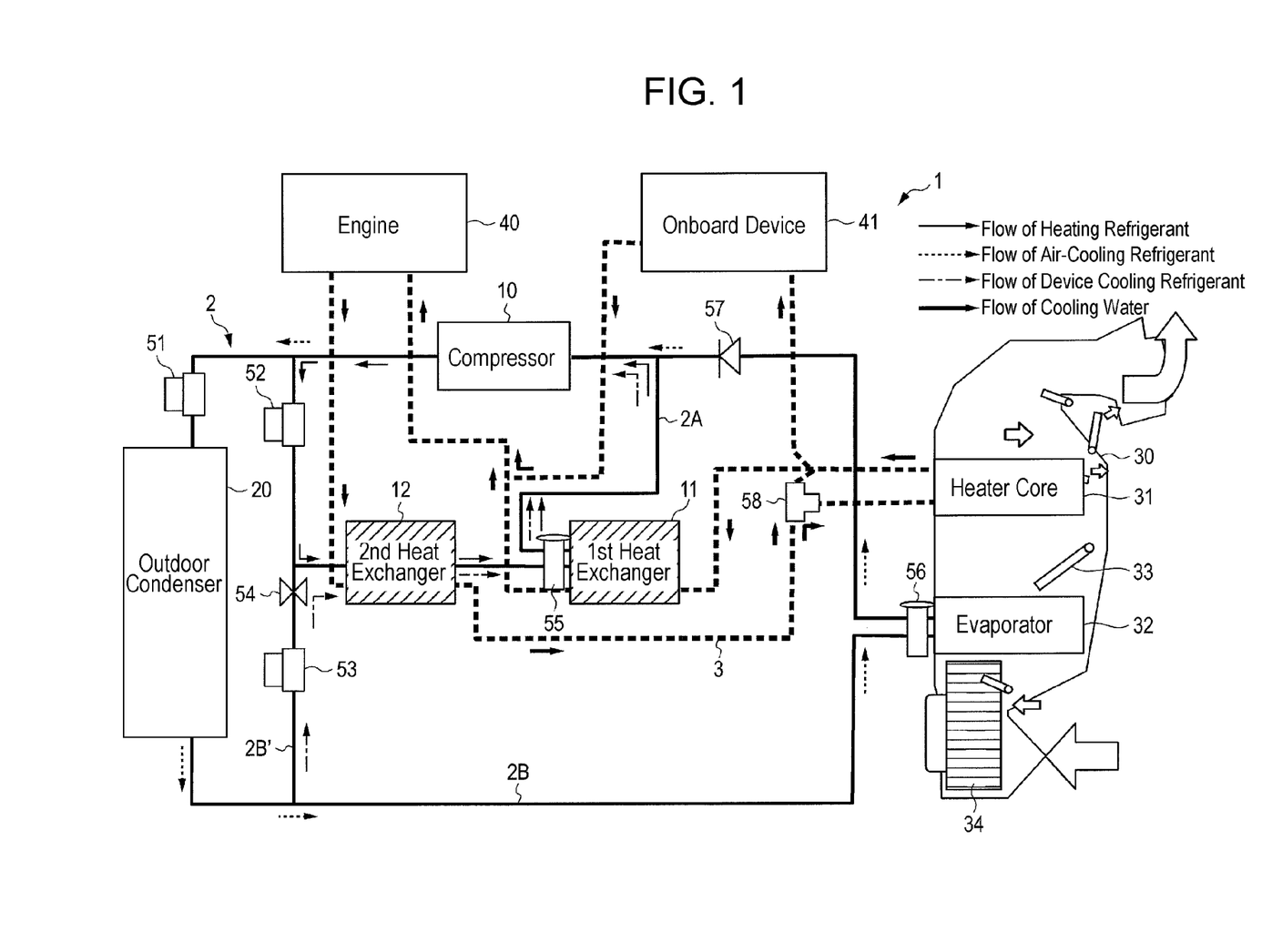
FIG. 1 is a block diagram illustrating a vehicle air conditioner according to a first exemplary embodiment.

FIG. 1 is a block diagram illustrating a vehicle air conditioner according to a first exemplary embodiment of the present disclosure.

Vehicle air conditioner 1 of the first exemplary embodiment is mounted to a vehicle and performs air conditioning of an interior of the vehicle. The vehicle includes engine (internal-combustion engine) 40 corresponding to heat generating component and onboard device (such as an oil cooler and an inverter) 41 corresponding to the temperature-controlled component.

Figure 2:
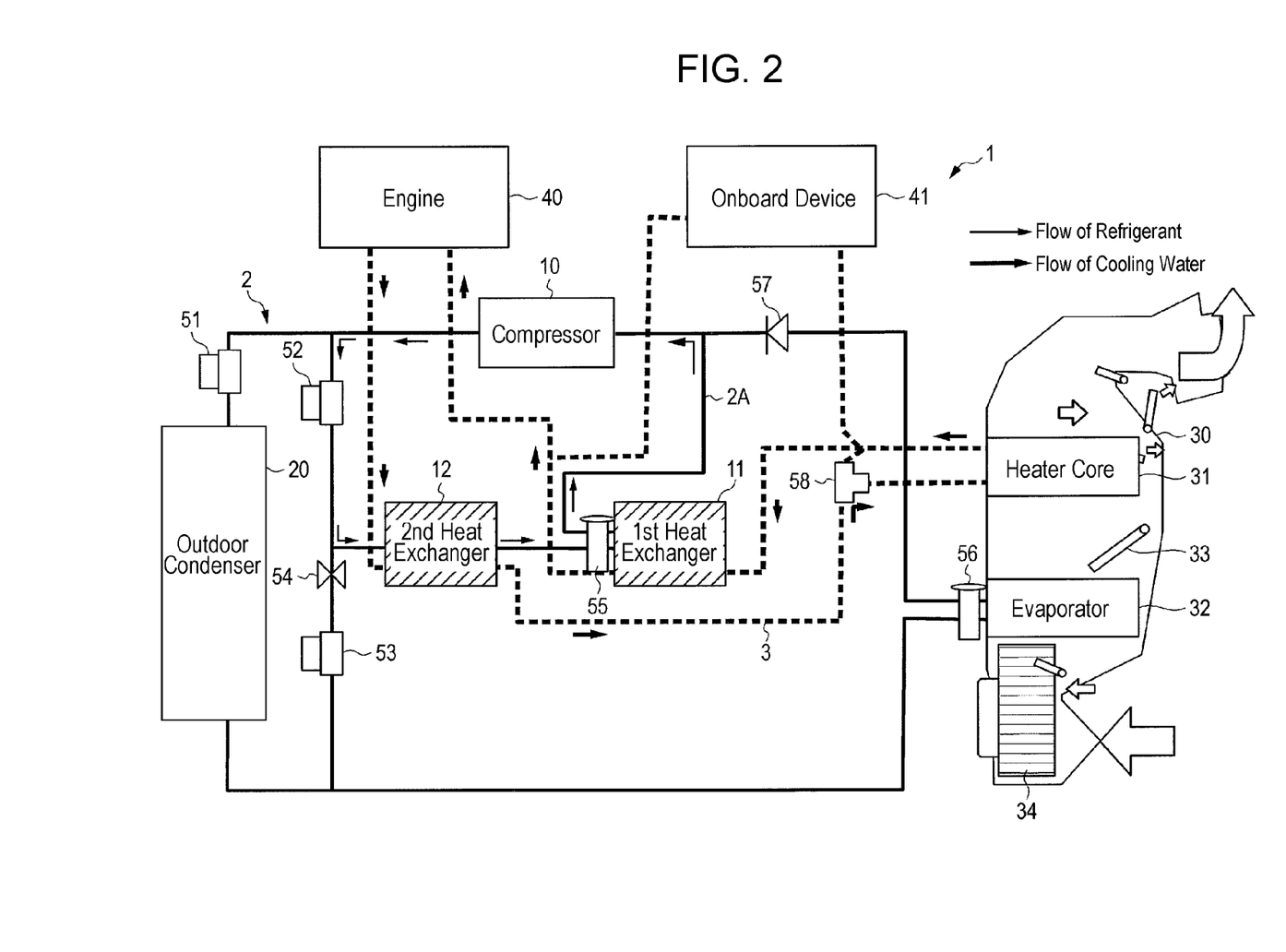
FIG. 2 is a view illustrating operation in a heating mode of the vehicle air conditioner of the first exemplary embodiment.
Figure 3:
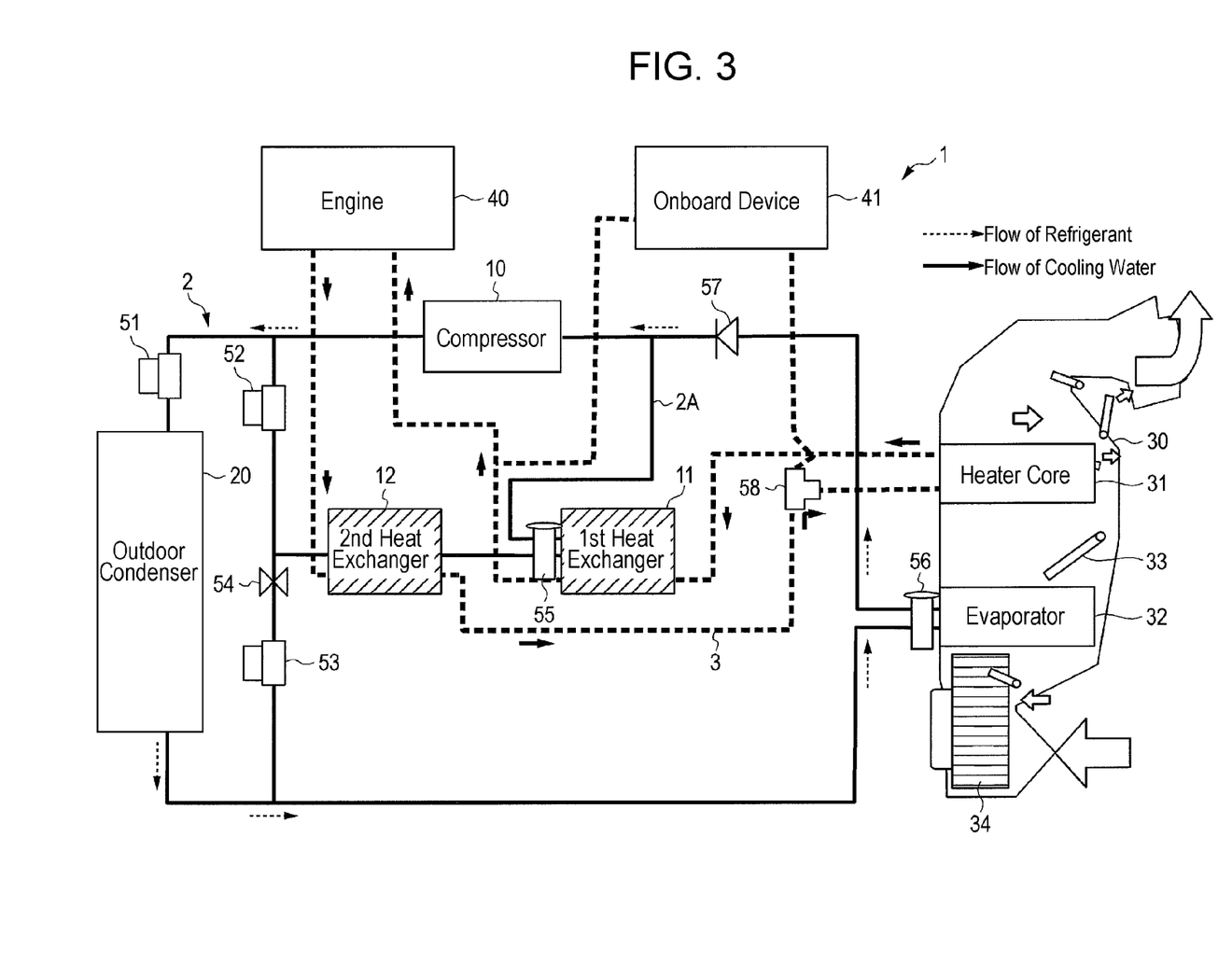
FIG. 3 is a view illustrating operation in an air-cooling mode of the vehicle air conditioner of the first exemplary embodiment.
Figure 4:
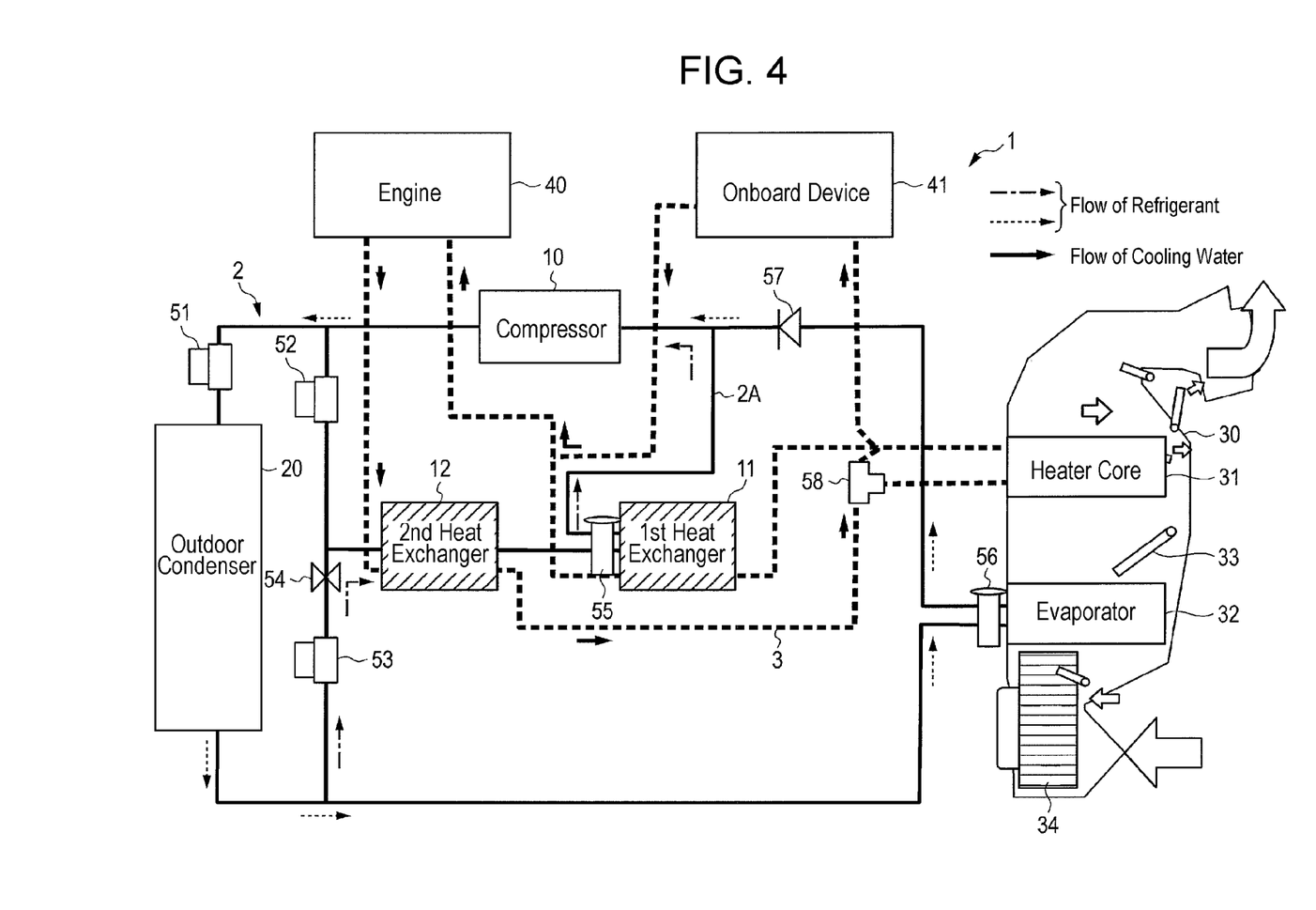
FIG. 4 is a view illustrating operation in an air-cooling and cooling mode of the vehicle air conditioner of the first exemplary embodiment.

FIG. 2 is a view illustrating operation in a heat pump heating mode for heating the vehicle interior. FIG. 3 is a view illustrating operation in an air-cooling mode for air-cooling the vehicle interior. FIG. 4 is a view illustrating operation in an air-cooling and cooling mode for air-cooling the vehicle interior while cooling onboard device 41. Detailed operation in FIGS. 2 to 4 will be described later.

Vehicle air conditioner 1 includes compressor 10, first heat exchanger 11, second heat exchanger 12, outdoor condenser (corresponding to a condenser) 20, heater core 31, evaporator 32, first on-off valve 51, second on-off valve 52, third on-off valve 53, throttle valve 54, expansion valves 55, 56, check valve 57, and three-way valve 58. Refrigerant circuit 2 (a circuit indicated by a solid line in FIG. 1) is constructed by connecting at least two of these components using a refrigerant pipe (passage) through which a refrigerant flows, and coolant circuit 3 (a circuit indicated by a dotted line in FIG. 1) is constructed by connecting at least two of these components using a coolant pipe (passage) through which a coolant flows. Vehicle air conditioner 1 is connected to engine 40 and onboard device 41 through the coolant pipe.

In refrigerant circuit 2, the refrigerant pipe that connects compressor 10, second heat exchanger 12, and first heat exchanger 11 to circulate the refrigerant constitutes heating refrigerant circuit 2A, and the refrigerant pipe that connects compressor 10, outdoor condenser 20, and evaporator 32 to circulate the refrigerant constitutes air-cooling refrigerant circuit 2B. A part of heating refrigerant circuit 2A and a part of air-cooling refrigerant circuit 2B are commonly used.

The coolant pipe constituting coolant circuit 3 connects engine 40 that is a cooling target, onboard device 41 that is cooling and warming targets, first heat exchanger 11, second heat exchanger 12, and heater core 31 to circulate the coolant.

Engine 40 includes an engine-cooling unit. The engine-cooling unit includes a water jacket that causes the coolant to flow around engine 40 and a pump that causes the coolant to flow in the water jacket, and dissipates exhaust heat of engine 40 to the coolant flowing in the water jacket. For example, the pump is rotated by the power of engine 40.

A coolant introducing port of the engine-cooling unit included in engine 40 communicates with first heat exchanger 11 and onboard device 41 through the coolant pipe. A coolant sending port of the engine-cooling unit included in engine 40 communicates with second heat exchanger 12 through the coolant pipe. The engine-cooling unit may include a radiator that radiates heat to outside air for a case where an exhaust heat amount of engine 40 increases.

For example, the coolant is an anti-freezing solution such as LLC (Long Life Coolant), and is liquid for transporting the heat. The transportation of the coolant in coolant circuit 3 can be performed only by the pump included in the engine-cooling unit. Consequently, cost reduction of the device and reduction of an installation space for the device can be achieved. A pump may be added to another point of the coolant pipe in order to enhance a coolant transporting capacity.

Onboard device 41 is a temperature-controlled component, such as an oil cooler and an inverter, which needs not only the warming but also the cooling. For example, a device-temperature controller having a configuration similar to that of the engine-cooling unit is provided in onboard device 41, the heat is dissipated from onboard device 41 to the coolant flowing in the device-temperature controller included in onboard device 41, or the heat is supplied from the coolant to onboard device 41. A pump that transports the coolant by the power may also be added to the device-temperature controller.

The coolant introducing port of the device-temperature controller included in onboard device 41 communicates with second heat exchanger 12 through the coolant pipe. On the other hand, the coolant sending port of the device-temperature controller included in onboard device 41 communicates with the coolant introducing port of the engine-cooling unit included in engine 40 through coolant pipe. For a case where the exhaust heat amount of onboard device 41 increases, the coolant sent from second heat exchanger 12 may be introduced into onboard device 41 through a radiator.

Compressor 10 is driven by power or electricity of the engine, compresses the sucked refrigerant, and discharges the refrigerant having a higher temperature and a higher pressure. The refrigerant compressed by compressor 10 is sent from a discharge port of compressor 10 to outdoor condenser 20 or second heat exchanger 12 through the refrigerant pipe.

The refrigerant having a lower temperature and a lower pressure discharged from first heat exchanger 11 or evaporator 32 is sacked from a suction port of compressor 10 through the refrigerant pipe.

In the refrigerant pipe extending from the discharge port of compressor 10, a branching part is provided. At the branching part, the refrigerant pipe branches into a pipe leading to a refrigerant introducing port of outdoor condenser 20 and a pipe leading to a refrigerant introducing port of second heat exchanger 12.

In the pipe extending from the discharge port of compressor 10 to the branching part, the refrigerant flows during both a heating period and an air-cooling period. In the pipe between the branching part and the refrigerant introducing port of outdoor condenser 20, first on-off valve (corresponding to a switching unit) 51 is disposed. First on-off valve 51 can shut off the flow of the refrigerant. On the other hand, in the pipe between the branching part and the refrigerant introducing port of second heat exchanger 12, second on-off valve (corresponding to a switching unit) 52 is disposed. Second on-off valve 52 can shut off the flow of the refrigerant.

First on-off valve 51 and second on-off valve 52 switch between an open state and a close state in the way of refrigerant pipe by, for example, electric control. For example, a pilot valve that is a type of solenoid valve is used as each of first on-off valve 51 and second on-off valve 52. In the pilot valve, a fluid flow is controlled by opening and closing a small hole, and a valve element is operated using a fluid pressure difference generated by the opening and the closing of the small hole. A flowing direction of the refrigerant is always kept the same at the points of the refrigerant pipe where first on-off valve 51 and second on-off valve 52 are disposed, so that the pilot valve can be used. The pilot valve can be operated without problems even if the refrigerant in the refrigerant pipe in which the pilot valve is disposed has a high pressure.

The control of switching between the opening and closing of first on-off valve 51 and second on-off valve 52 selects the sending circuit of the refrigerant having the higher temperature and the higher pressure and being discharged from compressor 10 among air-cooling refrigerant circuit 2B including outdoor condenser 20 and heating refrigerant circuit 2A including second heat exchanger 12.

Second heat exchanger 12 acts as a sub-condenser (condenser) in a heating mode (to be described in detail later). Second heat exchanger 12 includes an internal passage and an internal passage. The refrigerant having the higher temperature and the higher pressure and being discharged from compressor 10 flows through the internal passage, and the coolant flows through the internal passage. Second heat exchanger 12 performs heat exchange between the refrigerant and the coolant. Specifically, in the heating mode, the refrigerant having the higher temperature and the higher pressure is sent from compressor 10 to second heat exchanger 12, and the refrigerant having the higher temperature and the higher pressure dissipates the heat to the coolant. Consequently, second heat exchanger 12 condenses the refrigerant having the higher temperature and the higher pressure.

The refrigerant introducing port of second heat exchanger 12 communicates with the discharge port of compressor 10 through the refrigerant pipe of heating refrigerant circuit 2A. A refrigerant sending port of second heat exchanger 12 communicates sequentially with expansion valve 55 and first heat exchanger 11, and communicates with the suction port of compressor 10 through the refrigerant pipe of heating refrigerant circuit 2A. The refrigerant introducing port of second heat exchanger 12 also communicates with the refrigerant sending port of outdoor condenser 20 through the pipe branched from refrigerant pipe extending from outdoor condenser 20.

In this way, the refrigerant pipe leading to compressor 10 from outdoor condenser 20 is branched into the refrigerant pipe (first passage) passing through evaporator 32 and the refrigerant pipe (second passage) of bypass refrigerant circuit 2B' passing through second heat exchanger 12 disposed in parallel to evaporator 32. The refrigerant pipe of bypass refrigerant circuit 2B' upstream of second heat exchanger 12 is connected to the refrigerant pipe of heating refrigerant circuit 2A leading to second heat exchanger 12 from compressor 10. Consequently, the refrigerant pipe of bypass refrigerant 2B' communicates with the refrigerant introducing port of second heat exchanger 12.

In the refrigerant pipe of bypass refrigerant circuit 2B', a portion that communicates with the suction port of compressor 10 from the refrigerant sending port of second heat exchanger 12 through expansion valve 55 and first heat exchanger 11 in this order is common with the refrigerant pipe of heating refrigerant circuit 2A. In the refrigerant pipe of bypass refrigerant circuit 2B', third on-off valve (corresponding to an on-off valve) 53 is disposed. Third on-off valve 53 causes the refrigerant to flow into the refrigerant introducing port of second heat exchanger 12 or shuts off the refrigerant flow.

Third on-off valve 53 switches between the opening state and the closing state of the refrigerant pipe by, for example, electric control, and third on-off valve 53 shuts off the refrigerant flow when being closed. For example, a direct acting valve that is a type of solenoid valve is used as third on-off valve 53. In the direct acting valve, a movable core is operated to mechanically open and close a main orifice, thereby controlling the flow of the fluid (refrigerant).

The direct acting valve can be opened and closed by decreasing a connection diameter to be connected to the refrigerant pipe even if the refrigerant has a high pressure. In this case, the direct acting valve has a function of expanding the refrigerant, so that necessity of throttle valve 54 (to be described later) can be eliminated. When third on-off valve 53 is used together with the check valve, the pilot valve can be used instead of the direct acting valve.

In the state in which the refrigerant flows in air-cooling refrigerant circuit 2B, the control of switching between the opening and closing of third on-off valve 53 selects the way of the refrigerant sent from outdoor condenser 20 to return to compressor 10 among only the refrigerant pipe in which the evaporator 32 is located and both the refrigerant pipe in which the evaporator 32 is located and the refrigerant pipe of bypass refrigerant circuit 2B' including second heat exchanger 12 and first heat exchanger 11. Third on-off valve 53 only needs to shut off the refrigerant flow somewhere in the refrigerant pipe of bypass refrigerant circuit 2B', and the location of third on-off valve 53 is not limited to the position in FIG. 1.

In the state in which the refrigerant flows in heating refrigerant circuit 2A, second heat exchanger 12 acts as a sub-condenser (condenser) that performs the heat exchange between the refrigerant having the higher temperature and the higher pressure and the coolant and condenses the refrigerant. On the other hand, in the state in which the refrigerant flows in air-cooling refrigerant circuit 2B while third on-off valve 53 is opened, second heat exchanger 12 acts as a sub-evaporator (evaporator) that performs the heat exchange between the refrigerant, which is expanded after sent from outdoor condenser 20, and the coolant and evaporates the refrigerant.

Furthermore, throttle valve 54 is disposed between the refrigerant introducing port of second heat exchanger 12 and third on-off valve 53. Throttle valve 54 expands the refrigerant having the higher temperature and the higher pressure, and sends the refrigerant thus having the lower temperature and the lower pressure to second heat exchanger 12. An orifice solenoid valve may be used instead of third on-off valve 53 and throttle valve 54.

On the other hand, in coolant circuit 3, the coolant introducing port of second heat exchanger 12 communicates with the engine-cooling unit of engine 40 through the coolant pipe. On the other hand, the coolant sending port of second heat exchanger 12 communicates with heater core 31 or onboard device 41 through the coolant pipe using three-way valve 58.

Three-way valve 58 switches the flow of the coolant sent from the refrigerant sending port of second heat exchanger 12 to the flow toward heater core 31 or the flow toward onboard device 41 by, for example, electric control.

First heat exchanger 11 acts as the sub-evaporator (evaporator) in the heating mode and in the air-cooling and cooling mode. First heat exchanger 11 includes two internal passages. The refrigerant having the lower temperature and the lower pressure flows through one of the internal passages and the coolant flows the other of the internal passages. First heat exchanger 11 performs the heat exchange between the refrigerant and the coolant. Although described in detail later, the refrigerant having the lower temperature and the lower pressure is introduced into first heat exchanger 11 from expansion valve 55 and the heat is transferred from the coolant to the refrigerant having the lower temperature and the lower pressure both in the heating mode and the air-cooling and cooling mode. Consequently, first heat exchanger 11 evaporates the refrigerant having the lower temperature and the lower pressure.

The refrigerant introducing port of first heat exchanger 11 communicates with the refrigerant sending port of second heat exchanger 12 through expansion valve 55. On the other hand, the refrigerant sending port of first heat exchanger 11 communicates with a halfway point of refrigerant pipe connecting the check valve 57 and compressor 10.

Expansion valve 55 expands the refrigerant, and discharges the refrigerant having the lower temperature and the lower pressure to first heat exchanger 11. Expansion valve 55 is disposed close to first heat exchanger 11 and upstream of first heat exchanger 11. Expansion valve 55 is a thermal expansion valve having a function of automatically adjusting a discharged refrigerant amount according to, for example, a temperature of the refrigerant sent from first heat exchanger 11.

In coolant circuit 3, the coolant introducing port of first heat exchanger 11 communicates with heater core 31 through the coolant pipe. On the other hand, the coolant sending port of first heat exchanger 11 communicates with the engine-cooling unit of engine 40 through the coolant pipe.

Outdoor condenser 20 includes two internal passages. The refrigerant having the higher temperature and the higher pressure flows through one of the internal passages, and air flows the other of the internal passages. Outdoor condenser 20 is disposed around, for example, a leading end of an engine room of the vehicle, and performs the heat exchange between the refrigerant and the outside air. Both in the air-cooling mode and the air-cooling and cooling mode, the refrigerant having the higher temperature and the higher pressure and being discharged from compressor 10 flows into outdoor condenser 20, and the heat is discharged from the refrigerant to the outside air. For example, a fan may be provided to blow the outside air to outdoor condenser 20. A reservoir tank may be provided on the refrigerant sending-out side of outdoor condenser 20.

Heater core 31 and evaporator 32 are disposed in an intake passage of HVAC (Heating, Ventilation, and Air Conditioning) 30. Fan 34 that causes intake air to flow is provided in HVAC 30. Heater core 31 is included in coolant circuit 3, and evaporator 32 is included in refrigerant circuit 2.

Heater core 31 performs heat exchange between the coolant and air, and is disposed in the intake passage of HVAC 30 that supplies air to the vehicle interior. The heated coolant is supplied to heater core 31, and heater core 31 dissipates the heat to intake air sent to the vehicle interior (air sent to the vehicle interior) in the heating mode. Heater core 31 can adjust a passing air amount by an opening degree of door 33 located in the intake passage. Door 33 can be opened and closed by the electric control, and is also referred to as a mix door.

Evaporator 32 performs heat exchange between air and the refrigerant having the lower temperature and the lower pressure, and is disposed in the intake passage of HVAC 30. Both in the air-cooling mode and the air-cooling and cooling mode, the refrigerant having the lower temperature and the lower pressure flows into evaporator 32 to cool the intake air supplied to the vehicle interior (air sent to the vehicle interior).

Expansion valve 56 expands the high-pressure refrigerant, and discharges the refrigerant having the lower temperature and the lower pressure to evaporator 32. Expansion valve 56 is disposed close to evaporator 32 upstream of evaporator 32. Expansion valve 56 is a thermal expansion valve having the function of automatically adjusting the discharged refrigerant amount according to, for example, a temperature of the refrigerant sent from evaporator 32.

On the way of the refrigerant circuit leading to compressor 10 from evaporator 32, check valve 57 is disposed. Check valve 57 prevents a reverse flow of the refrigerant in the heating mode in which the refrigerant does not flow into outdoor condenser 20 and evaporator 32.

In the heating mode, sometimes a refrigerant pressure drops in outdoor condenser 20 and evaporator 32 when an outside air temperature is low. When the pressure drop is generated, the refrigerant flowing in refrigerant circuit 2A of first heat exchanger 11 and second heat exchanger 12 flows reversely to air-cooling refrigerant circuit 2B of evaporator 32 to lower efficiency of a heat pump cycle. Check valve 57 can avoid such inconvenience.

Vehicle air conditioner 1 includes a controller (not illustrated) as a configuration of a control system. The controller controls drive of compressor 10, drive of each operating portion of HVAC 30, the opening and closing of each of the on-off valves (first on-off valve 51, second on-off valve 52 and third on-off valve 53), the switching among the passages by three-way valve 58, the pump that transports the coolant by power, and so on. For example, the controller includes a microcomputer, an I/O, a program memory storing a control program, and a working memory, and the microcomputer performs predetermined control according to the control program. The controller may be constructed as one unit or a plurality of units.

Next, operation of vehicle air conditioner 1 will be described. Operation modes of vehicle air conditioner 1 includes a heat pump heating mode, an air-cooling mode, and an air-cooling and cooling mode in addition to the hot water heating mode, and vehicle air conditioner 1 is operated while switching these operation modes. In the hot water heating mode, the vehicle interior is heated without operating the heat pump. The heating mode, the air-cooling mode, and the air-cooling and cooling mode will sequentially be described below as representative examples.

Heating Mode

FIG. 2 is a view illustrating the operation in the heating mode. In the heating mode, first on-off valve 51 is closed, second on-off valve 52 is opened, and third on-off valve 53 is closed. Door 33 of heater core 31 is opened (for example, fully opened). Three-way valve 58 is switched such that the coolant sent from second heat exchanger 12 flows into heater core 31.

In the heating mode, the refrigerant discharged from compressor 10 circulates in heating refrigerant circuit 2A so as to return to compressor 10 through second heat exchanger 12, expansion valve 55, and first heat exchanger 11 in this order.

The refrigerant compressed by compressor 10 thus having the lower temperature and the lower pressure dissipates the heat to the coolant and is condensed in second heat exchanger 12. The condensed refrigerant expands to become the refrigerant having the lower temperature and the lower pressure in expansion valve 55, and the resultant refrigerant is sent to first heat exchanger 11. The refrigerant having the lower temperature and the lower pressure evaporates by absorbing the heat from the coolant in first heat exchanger 11. The evaporated, low-pressure refrigerant is sucked and compressed again by compressor 10.

The coolant circulates in coolant circuit 3 so as to flow sequentially in engine 40, second heat exchanger 12, heater core 31, and first heat exchanger 11. The coolant that absorbs the exhaust heat of the engine 40 is heated by second heat exchanger 12, and is sent to heater core 31. The high-temperature coolant can sufficiently heat the intake air sent to the vehicle interior in heater core 31.

The coolant passing through heater core 31 has a temperature higher than the outside temperature, so that the coolant can dissipate the heat to the refrigerant to evaporate the refrigerant in first heat exchanger 11. The coolant cooled by first heat exchanger 11 is sent to engine 40, and is used to cool engine 40.

The vehicle interior can sufficiently heated by the above operation.

Air-cooling Mode

FIG. 3 is a view illustrating the operation in the air-cooling mode. In the air-cooling mode, first on-off valve 51 is opened, second on-off valve 52 is closed, and third on-off valve 53 is closed. Door 33 of heater core 31 is fully closed. Three-way valve 58 is switched such that the coolant sent from second heat exchanger 12 flows into heater core 31.

In the air-cooling mode, the refrigerant discharged from compressor 10 circulates in air-cooling refrigerant circuit 2B so as to return to compressor 10 through outdoor condenser 20, expansion valve 56, and evaporator 32 in this order.

The refrigerant compressed by compressor 10 thus having the higher temperature and the higher pressure dissipates the heat to air and is condensed in outdoor condenser 20. The condensed refrigerant expands in expansion valve 56 and becomes to have the higher temperature and the higher pressure. The refrigerant having the lower temperature and the lower pressure is sent to evaporator 32. The refrigerant having the lower temperature and the lower pressure cools the intake air sent to the vehicle interior in the evaporator 32, so as to be evaporated. The evaporated, low-pressure refrigerant is sucked and compressed by compressor 10.

The coolant flow is identical to that in the heating mode, and the coolant circulates in coolant circuit 3 so as to flow sequentially in engine 40, second heat exchanger 12, heater core 31, and first heat exchanger 11. In this case, the coolant hardly performs the heat exchange with the refrigerant or air when the coolant passes sequentially through second heat exchanger 12, heater core 31, and first heat exchanger 11. The heat of the coolant is mainly radiated by the radiator of the engine-cooling unit of engine 40.

Because engine 40 becomes to have an extremely high temperature, engine 40 is cooled by the radiation of the radiator even if the outside air temperature is high. Note that the much coolant may flow to the radiator, and the little coolant may flow to heater core 31.

The air-cooling of the vehicle interior can sufficiently performed by the above operation.

Air-Cooling and Cooling Mode

FIG. 4 is a view illustrating the operation in the air-cooling and cooling mode. In the air-cooling and cooling mode, first on-off valve 51 is opened, second on-off valve 52 is closed, and third on-off valve 53 is opened. Door 33 of heater core 31 is fully closed. Three-way valve 58 is switched such that the coolant sent from second heat exchanger 12 flows into not heater core 31 but onboard device 41.

In the air-cooling and cooling mode, the refrigerant discharged from compressor 10 flows into outdoor condenser 20 in air-cooling refrigerant circuit 2B. Thereafter, the refrigerant flows in not only the refrigerant pipe (first passage) passing through evaporator 32 but also the refrigerant pipe (second passage) passing through each heat exchanger (first heat exchanger 11, second heat exchanger 12) disposed in parallel to evaporator 32.

That is, the refrigerant sent from outdoor condenser 20 flows in the refrigerant pipe returning to compressor 10 through expansion valve 56 and evaporator 32 in this order. The refrigerant also flows in the refrigerant pipe of bypass refrigerant circuit 2B' returning to compressor 10 through third on-off valve 53, throttle valve 54, second heat exchanger 12, and first heat exchanger 11 in this order.

In this case, the refrigerant compressed by compressor 10 dissipates the heat to air and is condensed in outdoor condenser 20. The condensed refrigerant expands to become the refrigerant having the lower temperature and the lower pressure in expansion valve 56, and is sent to evaporator 32. The refrigerant having the lower temperature and the lower pressure cools the intake air sent to the vehicle interior in the evaporator 32, and is evaporated. The evaporated, low-pressure refrigerant is sucked and compressed by compressor 10.

On the other hand, the refrigerant flowing in the refrigerant pipe of bypass refrigerant circuit 2B' is sent to second heat exchanger 12 after expanded in throttle valve 54. Second heat exchanger 12 cools the coolant by not condensing the refrigerant unlike the heating mode, but evaporating the refrigerant.

The refrigerant sent from second heat exchanger 12 expand to have the lower temperature and the lower pressure in expansion valve 55, and the refrigerant having the lower temperature and the lower pressure is sent to first heat exchanger 11. The refrigerant having the lower temperature and the lower pressure is evaporated by the heat absorbed from the coolant in first heat exchanger 11. The evaporated, low-pressure refrigerant is sucked and compressed again by compressor 10.

On the other hand, unlike in the air-cooling mode, the coolant circulates in coolant circuit 3 so as to flow subsequently through engine 40, second heat exchanger 12, and onboard device 41. The coolant absorbing the heat in engine 40 is cooled by second heat exchanger 12, and sent to onboard device 41 through three-way valve 58. In this way, the coolant cooled in second heat exchanger 12 is sent to onboard device 41, which allows onboard device 41 to be cooled.

By the above operation, the air-cooling of the vehicle interior can sufficiently be performed, and the cooling of onboard device 41 can also be performed.

As described above, vehicle air conditioner 1 of the first exemplary embodiment has, as the basic configuration, both the configuration of the hot water heater in which the coolant of engine 40 is used for the heating by flowing in heater core 31 and the configuration of the heat pump air-cooling device in which the air-cooling is performed using the refrigerant having the lower temperature and the lower pressure of the heat pump. Vehicle air conditioner 1 of the first exemplary embodiment has the configuration in which the auxiliary heating function of further heating the coolant by the heat pump is added to the basic configuration. With this configuration, even if engine 40 has a low temperature, the heating of the vehicle interior can quickly be performed with less energy by action of the heat pump.

That is, vehicle air conditioner 1 of the first exemplary embodiment, while based on the configuration of the hot water heater and the heat pump air-cooling device used in the conventional vehicle, uses compressor 10 and the refrigerant, which are common to the air-cooling period and the heating period. Therefore, the heating performance can be improved with low cost and an increase in installation space from the conventional configuration can be suppressed.

Furthermore, vehicle air conditioner 1 of the first exemplary embodiment has bypass refrigerant circuit 2B' in addition to air-cooling refrigerant circuit 2B, and has third on-off valve 53. In the air-cooling and cooling mode in which the refrigerant flows in bypass refrigerant circuit 2B', second heat exchanger 12 acts as not the sub-condenser but the sub-evaporator. Consequently, the function of cooling onboard device 41 can be added using directly the basic configuration while the increase in the number of components and installation space are suppressed as much as possible.

That is, only changing a part of a route, in air-cooling refrigerant circuit 2B, through which the refrigerant flows allows the coolant to be heated and cooled, and onboard device 41 can be heated and cooled while the complicated configuration is prevented.

Although the description of the detailed operation in the case that onboard device 41 is heated is omitted, for example, in the heating mode, the high-temperature coolant flows into onboard device 41 by switching three-way valve 58, which allows onboard device 41 to be easily heated without adding a new pipe.

According to vehicle air conditioner 1 of the first exemplary embodiment, in the refrigerant circuit 2, the refrigerant pipe leading to first heat exchanger 11 from second heat exchanger 12 is different from the refrigerant pipe leading to evaporator 32 from outdoor condenser 20. So that the refrigerant pipes can independently be adjusted so as to be suitable for a plurality of operation modes (such as the heating mode and the air-cooling mode).

Vehicle air conditioner 1 of the first exemplary embodiment includes expansion valve 55 that expands the refrigerant in front of first heat exchanger 11, and expansion valve 56 that expands the refrigerant in front of evaporator 32. So that the expansion valves can independently be adjusted so as to be suitable for the plurality of operation modes.

In the present exemplary embodiment, the heat exchange between air and the refrigerant is performed in the air-cooling mode, and the heat exchange between the coolant and the refrigerant is performed in the heating mode. The adjustment can be performed so as to be suitable for the plurality of operation modes, so that operation performance specific to each operation mode can be exerted. The operation mode can smoothly be switched.

In the configuration in which the refrigerant pipe leading to first heat exchanger 11 from second heat exchanger 12 is common with a part of the refrigerant pipe leading to evaporator 32 from outdoor condenser 20, the refrigerant accumulated in outdoor condenser 20 is hardly recovered when switching the operation mode, and a refrigerant amount becomes unstable. However, the problem is hardly generated in vehicle air conditioner 1 of the first exemplary embodiment.

In the present exemplary embodiment, by way of example, first heat exchanger 11 is disposed downstream of second heat exchanger 12 in heating refrigerant circuit 2A. However, the vehicle air conditioner may have a configuration in which first heat exchanger 11 is not included. This case will be described below.

Second Exemplary Embodiment

Figure 5:
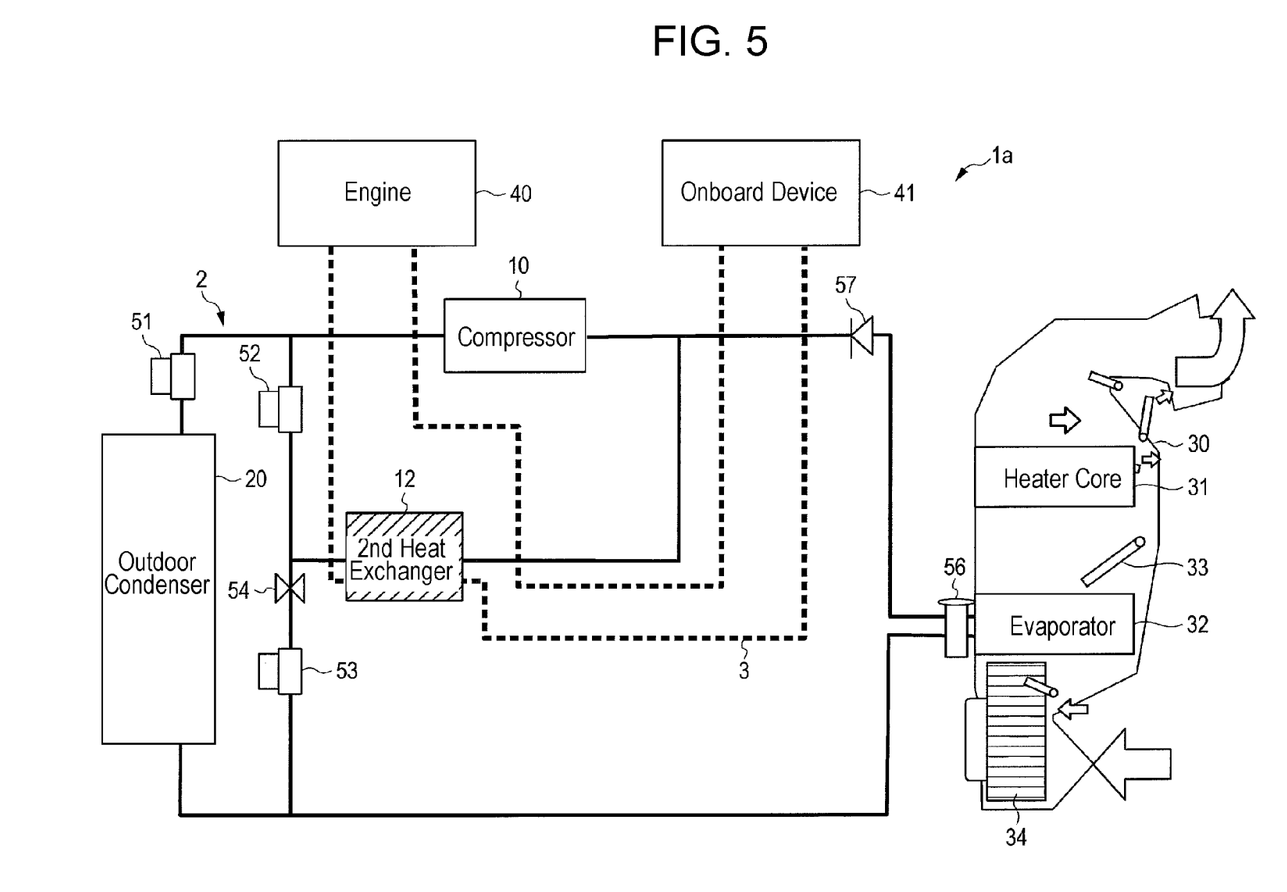
FIG. 5 is a block diagram illustrating a vehicle air conditioner according to a second exemplary embodiment.

FIG. 5 is a block diagram illustrating vehicle air conditioner 1a according to a second exemplary embodiment of the present disclosure. The components similar to those of the first exemplary embodiment are denoted by the identical reference marks, and the overlapping description will be omitted.

A basic configuration of vehicle air conditioner 1a is common with that of the first exemplary embodiment. However, in vehicle air conditioner 1a, first heat exchanger 11 is not disposed between the refrigerant sending port of second heat exchanger 12 and the refrigerant suction port of compressor 10 in refrigerant circuit 2, but a hot gas cycle system may be adopted.

In the example of FIG. 5, coolant circuit 3 is configured such that the coolant circulates through engine 40, second heat exchanger 12, and onboard device 41. Even in vehicle air conditioner 1a, similarly to vehicle air conditioner 1, second heat exchanger 12 can heat and cool the coolant. The operating mode can be switched to one of the heating mode, the air-cooling mode, and the air-cooling and cooling mode according to a temperature control situation (to be warmed or to be cooled) of onboard device 41.

That is, in FIG. 5, when first on-off valve 51 is closed, second on-off valve 52 is opened, and third on-off valve 53 is closed, the operating mode is switched to the heating mode. In the heating mode, the refrigerant discharged from compressor 10 circulates so as to return to compressor 10 through second heat exchanger 12. The coolant circulates so as to flow sequentially through engine 40, second heat exchanger 12, and onboard device 41. Second heat exchanger 12 performs heat exchange between the refrigerant having the higher temperature and the higher pressure and the coolant, and the heated coolant is sent to onboard device 41 to heat onboard device 41.

When first on-off valve 51 is opened, second on-off valve 52 is closed, and third on-off valve 53 is closed, the operating mode is switched to the air-cooling mode. In the air-cooling mode, the refrigerant discharged from compressor 10 circulates so as to return to compressor 10 through outdoor condenser 20, expansion valve 56, evaporator 32, and compressor 10 in this order. The coolant flow is similar to that of the heating mode.

When first on-off valve 51 is opened, second on-off valve 52 is closed, and third on-off valve 53 is opened, the operating mode is switched to the air-cooling and cooling mode. In the air-cooling and cooling mode, similarly to the air-cooling mode, the refrigerant discharged from compressor 10 flows into not only the refrigerant pipe (first passage) passing through evaporator 32 but also the refrigerant pipe (second passage) passing through second heat exchanger 12 disposed in parallel to evaporator 32. The coolant flow is similar to that of the heating mode and the air-cooling mode.

Second heat exchanger 12 performs heat exchange between the refrigerant expanded in throttle valve 54 and the coolant, and the cooled coolant is sent to onboard device 41 to cool onboard device 41.

Although the pipe through which the coolant sent from second heat exchanger 12 is sent to heater core 31 is not illustrated in FIG. 5, similarly to the first exemplary embodiment, coolant circuit 3 may be configured such that the coolant can be sent to one of onboard device 41 and heater core 31.

Third Exemplary Embodiment

Figure 6:
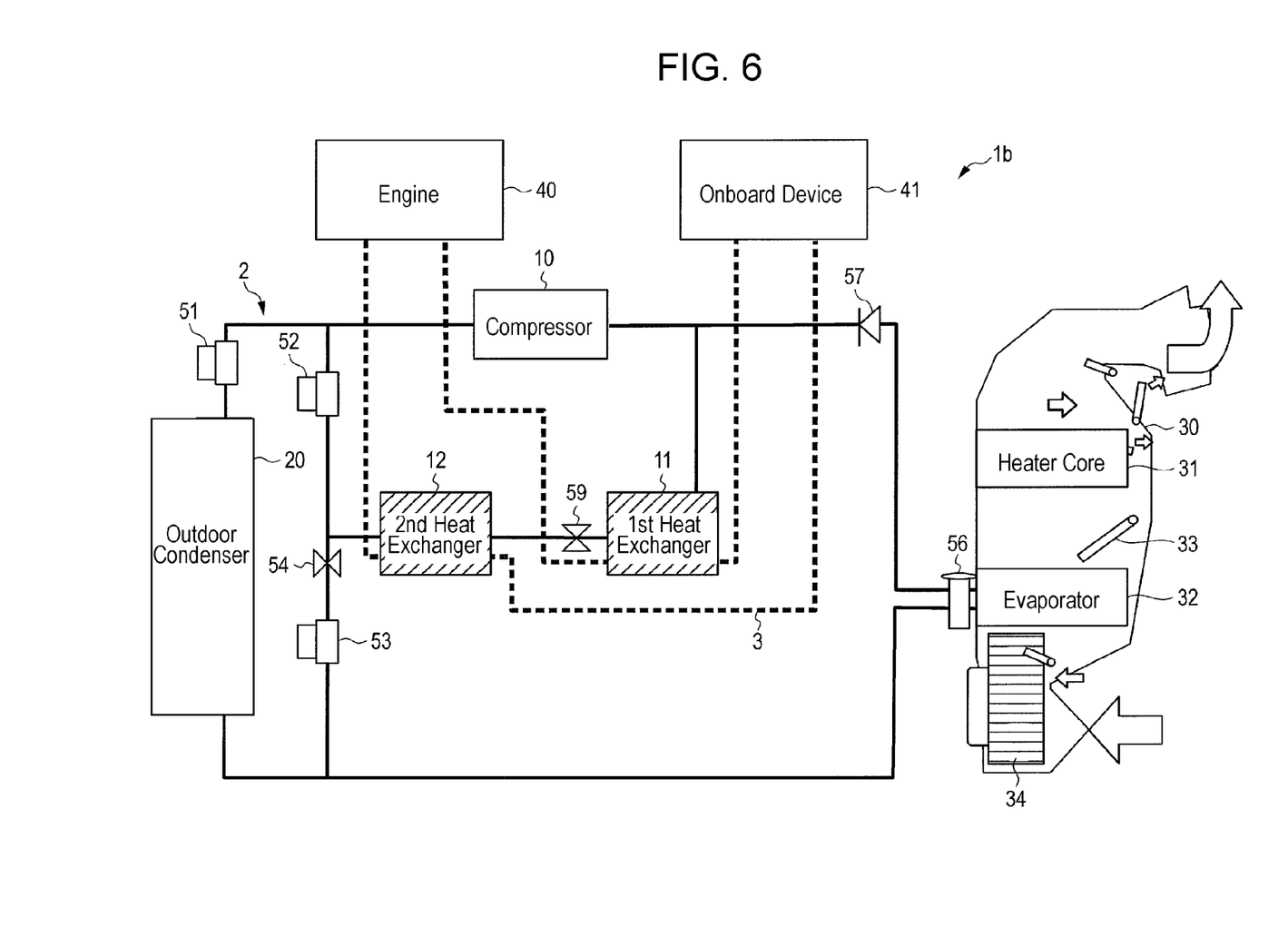
FIG. 6 is a block diagram illustrating a vehicle air conditioner according to a third exemplary embodiment.

FIG. 6 is a block diagram illustrating vehicle air conditioner 1b according to a third exemplary embodiment of the present disclosure. The components similar to those of the first and second exemplary embodiments are denoted by the identical reference marks, and the overlapping description will be omitted.

Vehicle air conditioner 1b has the configuration in which throttle valve 59 and first heat exchanger 11 are added to vehicle air conditioner 1a of the second exemplary embodiment. That is, first heat exchanger 11 similar to that of the first exemplary embodiment and throttle valve 59 are disposed between the refrigerant sending port of second heat exchanger 12 and the refrigerant suction port of compressor 10 in refrigerant circuit 2 to form the heat pump cycle.

Coolant circuit 3 is configured such that the coolant circulates through engine 40, second heat exchanger 12, onboard device 41, and first heat exchanger 11.

Even in vehicle air conditioner 1b, similarly to vehicle air conditioner 1a, second heat exchanger 12 can heat and cool the coolant. The operating mode can be switched to one of the heating mode, the air-cooling mode, and the air-cooling and cooling mode by the opening and closing control of each on-off valve (first on-off valve 51, second on-off valve 52, third on-off valve 53) according to a temperature control situation (to be warmed or to be cooled) of onboard device 41.

The heat pump cycle that further cools the coolant passing through onboard device 41 is formed by providing, in particular, first heat exchanger 11. Thus, as compared with vehicle air conditioner 1a of the second exemplary embodiment, the exhaust heat of engine 40 can further be absorbed, and stable drive can be performed irrespective of the outside air temperature.

In refrigerant circuit 2, throttle valve 59 that expands the refrigerant is disposed upstream of first heat exchanger 11. Although throttle valve 59 has the configuration similar to that of throttle valve 54, expansion valve 55 may be used instead of throttle valve 54, and selection of the specific type of the valve may be changed as appropriate.

Although the pipe through which the coolant sent from second heat exchanger 12 is sent to heater core 31 is not illustrated in FIG. 6, similarly to the first exemplary embodiment, coolant circuit 3 may be configured such that the coolant can be sent to one of onboard device 41 and heater core 31.

Fourth Exemplary Embodiment

Figure 7:
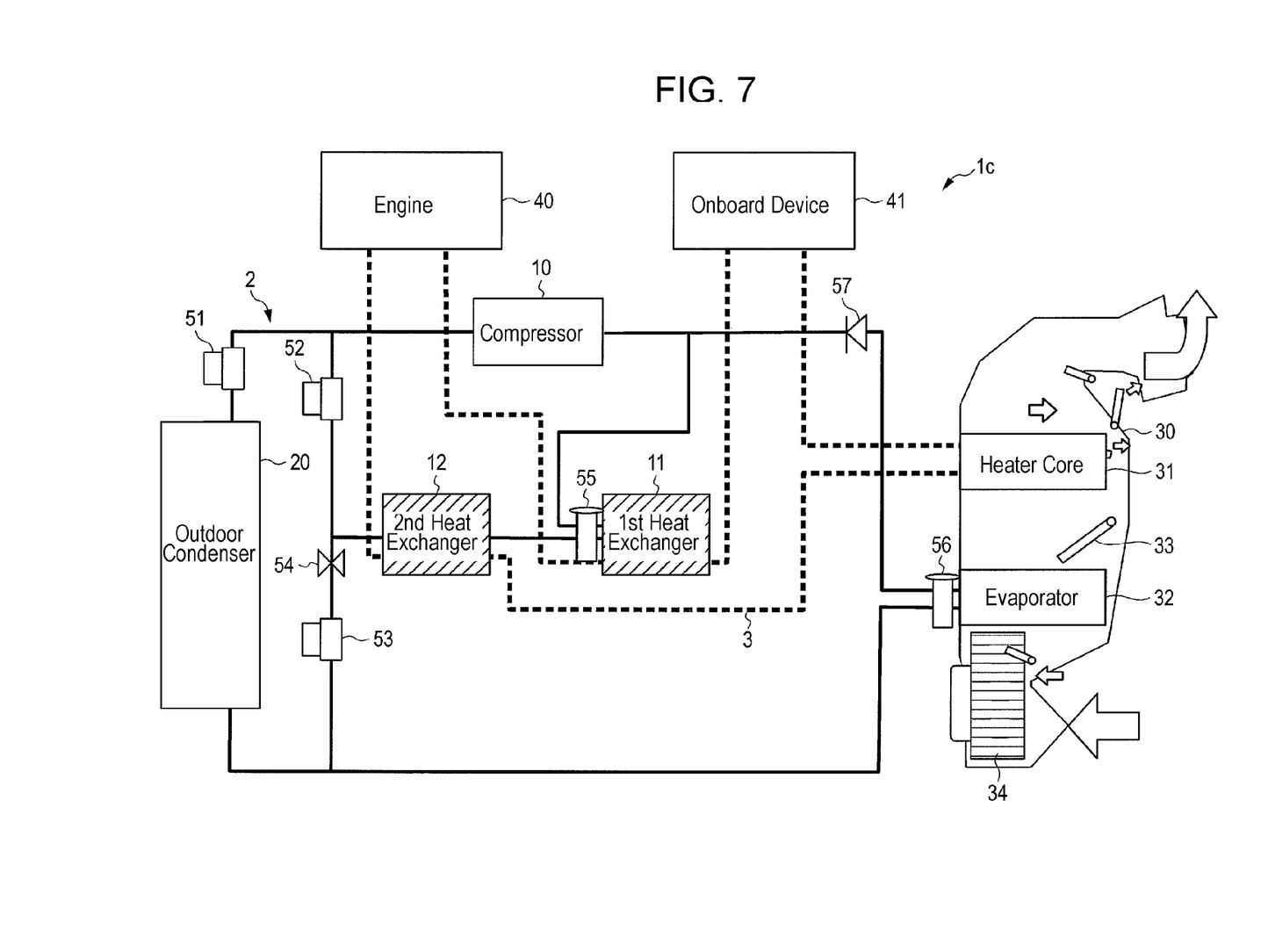
FIG. 7 is a block diagram illustrating a vehicle air conditioner according to a fourth exemplary embodiment.

FIG. 7 is a block diagram illustrating vehicle air conditioner 1c according to a fourth exemplary embodiment of the present disclosure. The components similar to those of the first to third exemplary embodiments are denoted by the identical reference marks, and the overlapping description will be omitted.

The basic configuration of vehicle air conditioner 1c is common with that of the first exemplary embodiment, refrigerant circuit 2 has the configuration similar to that of the first exemplary embodiment. However, coolant circuit 3 of the fourth exemplary embodiment differs from coolant circuit 3 of the first exemplary embodiment in a part of a route of the coolant pipe.

Specifically, coolant circuit 3 is configured such that the coolant circulates through engine 40, second heat exchanger 12, heater core 31, onboard device 41, and first heat exchanger 11. Heater core 31 and onboard device 41 are disposed in series. Thus, onboard device 41 can simultaneously be warmed when heater core 31 is warmed, and heater core 31 can simultaneously be warmed when onboard device 41 is warmed.

Fifth Exemplary Embodiment

Figure 8:
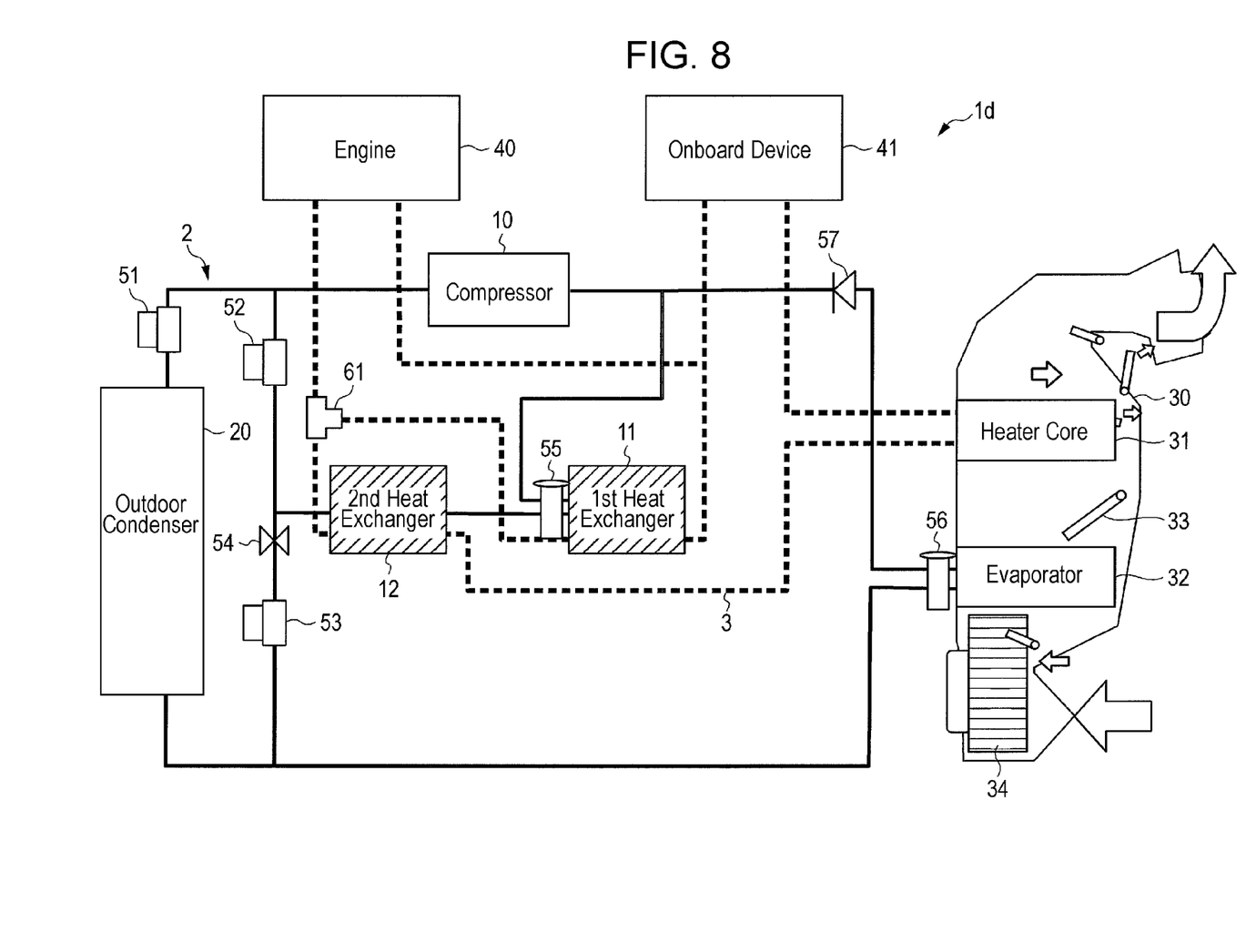
FIG. 8 is a block diagram illustrating a vehicle air conditioner according to a fifth exemplary embodiment.

FIG. 8 is a block diagram illustrating vehicle air conditioner 1d according to a fifth exemplary embodiment of the present disclosure. The components similar to those of the first to fourth exemplary embodiments are denoted by the identical reference marks, and the overlapping description will be omitted.

The basic configuration of vehicle air conditioner 1d is common with that of the third exemplary embodiment, and refrigerant circuit 2 has the configuration similar to that of the first and third exemplary embodiments. However, coolant circuit 3 of the present exemplary embodiment differs from coolant circuit 3 of the first and third exemplary embodiments in a part of the route of the coolant pipe.

Specifically, in coolant circuit 3, the coolant pipe from the refrigerant sending port of engine 40 is branched by three-way valve 61 into two coolant passages. Thus, coolant circuit 3 is configured such that the coolant passages can be switched by three-way valve 61. In one of the coolant passages, the coolant flows through second heat exchanger 12 and onboard device 41 and returns to the refrigerant introducing port of engine 40. In the other of the coolant passages, the coolant flows through expansion valve 55 and first heat exchanger 11 and returns to the refrigerant introducing port of engine 40.

Three-way valve 61 can switch the flow of the coolant sent from engine 40 to one side and the other side by, for example, the electric control. The coolant flows in one of first heat exchanger 11 and second heat exchanger 12, whereby a pressure loss can be reduced.

The exemplary embodiments of the present disclosure are described above with reference to the drawings. However, the specific configuration is not limited to the exemplary embodiments, but the changes and additions can be made without departing from the aspects of the present disclosure. For example, the vehicle air conditioner of the present disclosure may be applied to not only the system constituting the heat pump cycle but also the system constituting the hot gas cycle like vehicle air conditioner 1a of the second exemplary embodiment.

In the above exemplary embodiments, the heated component of the vehicle is engine 40 by way of example. Alternatively, the heated component of the vehicle may be an electric motor for running an electrically driven vehicle, a secondary battery that supplies running power, or the like.

First heat exchanger 11, second heat exchanger 12, expansion valve 55, first on-off valve 51, second on-off valve 52 and other components may be formed as an integrated unit. Herein, the unit may be one in which the components are integrated while accommodated in one housing, or one that is integrated by bonding the components.

INDUSTRIAL APPLICABILITY

The present disclosure can be applied to the vehicle air conditioner mounted to various vehicles such as an engine vehicle, an electrically driven vehicle, and an HEV (Hybrid Electric Vehicle).

REFERENCE MARKS IN THE DRAWINGS 1, 1a, 1b, 1c, 1d vehicle air conditioner
2 refrigerant circuit
2A heating refrigerant circuit
2B air-cooling refrigerant circuit
2B' bypass refrigerant circuit
3 coolant circuit
10 compressor
11 first heat exchanger
12 second heat exchanger
51 first on-off valve (switching unit)
52 second on-off valve (switching unit)
53 third on-off valve (on-off valve)
54, 59 throttle valve
55, 56 expansion valve
57 check valve
58, 61 three-way valve
20 outdoor condenser
30 HVAC
31 heater core
32 evaporator
33 door
34 fan 40 engine (engine-cooling unit)
onboard device

The invention claimed is:

1. A vehicle air conditioner comprising:
a compressor that compresses a refrigerant;
a condenser that condenses the refrigerant by dissipating heat of the refrigerant having a higher temperature and a higher pressure;
an evaporator that performs heat exchange between air sent to an interior of a vehicle to which the vehicle air conditioner is to be mounted and the refrigerant having a lower temperature and a lower pressure;
a heat exchanger that is disposed in parallel to the evaporator and performs heat exchange between the refrigerant and a heat transporting coolant;
a refrigerant passage through which the refrigerant passes;
an on-off valve that can shut off the refrigerant passage; and
a heating refrigerant circuit configured with the refrigerant passage such that the refrigerant flows from the compressor, passes through the heat exchanger, and returns to the compressor;
an air-cooling refrigerant circuit configured with the refrigerant passage such that the refrigerant flows from the compressor, passes through the condenser and the evaporator, and returns to the compressor; and
a switching unit capable of switching between the state in which the refrigerant flows in the heating refrigerant circuit and a state in which the refrigerant flows in the air-cooling refrigerant circuit,
wherein a part of the refrigerant passage from the condenser to the compressor in the air-cooling refrigerant circuit is branched into a first passage passing through the evaporator and a second passage passing through the heat exchanger, and
the on-off valve is disposed upstream of the heat exchanger in the second passage,
in the state in which the refrigerant flows in the air-cooling refrigerant circuit, the on-off valve switches between a first state and a second state,
in the first state, the on-off valve is closed to prevent the refrigerant from flowing into the heat exchanger, and allow the refrigerant to flow into the evaporator, and
in the second state, the on-off valve is opened to allow the refrigerant to flow into both the heat exchanger and the evaporator,
in the refrigerant circuit, a part of the refrigerant passage extending from the compressor includes a branching part at which the part of the refrigerant passage extending from the compressor is branched into a third passage leading to the condenser in the air-cooling refrigerant circuit and a fourth passage leading to the heat exchanger in the heating refrigerant circuit, and
the switching unit shuts off one of a part of the refrigerant passage between the branching part and the condenser and another part of the refrigerant passage between the branching part and the heat exchanger, so as to switch the state in which the refrigerant flows in the air-cooling refrigerant circuit to the state in which the refrigerant flows in the heating refrigerant circuit.

2. The vehicle air conditioner according to claim 1,
wherein the heat exchanger performs heat exchange:
between the heat transporting coolant and the refrigerant having the higher temperature and the higher pressure so as to condense the refrigerant, in a state in which the refrigerant flows in the heating refrigerant circuit, and
between the heat transporting coolant and the refrigerant sent from the condenser and then expanded so as to evaporate the refrigerant, in a state in which the refrigerant flows in the air-cooling refrigerant circuit and the on-off valve is opened.

3. The vehicle air conditioner according to claim 1,
wherein the on-off valve comprises a direct acting valve, and
the switching unit comprises a pilot valve.

4. The vehicle air conditioner according to claim 1,
wherein the heat exchanger receives the heat transporting coolant from a heat generating component of the vehicle, and sends the heat transporting coolant to at least one of a component of the vehicle and a heater core that heats the air sent to the interior of the vehicle, a temperature of the component being to be controlled.

5. The vehicle air conditioner according to claim 1,
wherein the heat exchanger includes a first heat exchanger and a second heat exchanger,
the first heat exchanger is disposed in series with the second heat exchanger downstream of the second heat exchanger in the heating refrigerant circuit, and
in the state in which the refrigerant flows in the heating refrigerant circuit, the first heat exchanger receives the heat transporting coolant and performs heat exchange between the heat transporting coolant and the refrigerant having the lower temperature and the lower pressure, so as to evaporate the refrigerant.

* * * * *